(12) United States Patent
Akamine et al.

(10) Patent No.: US 8,713,921 B2
(45) Date of Patent: May 6, 2014

(54) EXHAUST-GAS PURIFICATION CATALYTIC SYSTEM

(75) Inventors: Masaaki Akamine, Hiroshima (JP); Masahiko Shigetsu, Higashi-Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 233 days.

(21) Appl. No.: 13/353,263

(22) Filed: Jan. 18, 2012

(65) Prior Publication Data
US 2012/0186238 A1 Jul. 26, 2012

(30) Foreign Application Priority Data

Jan. 26, 2011 (JP) ................... 2011-014325

(51) Int. Cl.
*F01N 3/10* (2006.01)
(52) U.S. Cl.
USPC .............................................. 60/299; 60/286
(58) Field of Classification Search
USPC ................... 60/286, 299; 422/631, 633
See application file for complete search history.

(56) References Cited

U.S. PATENT DOCUMENTS

| | | | |
|---|---|---|---|
| 6,375,910 B1 * | 4/2002 | Deeba et al. | ............... 423/239.1 |
| 7,344,683 B2 | 3/2008 | Miyoshi et al. | |
| 7,785,545 B2 | 8/2010 | Miyoshi et al. | |
| 2006/0228274 A1 * | 10/2006 | Okada | ............... 422/177 |
| 2006/0276331 A1 * | 12/2006 | Akamine et al. | ............... 502/304 |
| 2008/0056965 A1 * | 3/2008 | Miyoshi et al. | ............... 422/172 |
| 2011/0045968 A1 | 2/2011 | Akamine et al. | |
| 2011/0219748 A1 * | 9/2011 | Akama et al. | ............... 60/274 |

FOREIGN PATENT DOCUMENTS

| | | |
|---|---|---|
| JP | 2006-062156 A | 3/2006 |
| JP | 2006-291918 A | 10/2006 |
| JP | 2010-071765 A | 4/2010 |
| JP | 2011-062683 A | 3/2011 |

* cited by examiner

*Primary Examiner* — Thomas Denion
*Assistant Examiner* — Jason Shanske
(74) *Attorney, Agent, or Firm* — Studebaker & Brackett PC (57) ABSTRACT

An upper catalyst layer of an upstream catalyst 3 and a downstream catalyst 5 includes an oxygen storage/release material in/on which a catalytic metal is included or loaded. The content of the oxygen storage/release material per 1 L of a substrate in the catalyst layer of the upstream catalyst 3 is larger than that in the catalyst layer of the downstream catalyst 5. The oxygen release amount per a unit amount of the Rh is larger than that for the upper catalyst layer of the upstream catalyst 5. At least part of the oxygen storage/release material included in the downstream catalyst shows a particle size distribution having a peak particle size smaller than that in the upstream catalyst 5.

7 Claims, 7 Drawing Sheets

EXHAUST-GAS PURIFICATION CATALYTIC SYSTEM

CROSS-REFERENCE TO RELATED APPLICATION

This application claims priority to Japanese Patent Application No. 2011-014325 filed on Jan. 26, 2011, the disclosure of which including the specification, the drawings, and the claims is hereby incorporated by reference in its entirety.

BACKGROUND

The present disclosure relates to exhaust-gas purification catalytic systems.

Hybrid automobiles using both engines and electric motors as drive sources can reduce emission which is an environmental load. In addition, it is also important to further efficiently purify exhaust gas from engines. Automobiles whose engines operate near the stoichiometric air-fuel ratio conventionally use three-way catalysts capable of purifying hydrocarbon (HC), CO, and nitrogen oxide (NOx) at the same time. As catalytic metals, Pt, Pd, and Rh, for example, have been adopted.

In such a three-way catalyst, purification performance for HC, CO, and NOx described above degrades when the air-fuel ratio of an exhaust gas from an engine comes to be in a lean or rich condition. To prevent this degradation, the three-way catalyst includes an oxygen storage/release material which stores oxygen when the ambience of the catalyst is in a lean condition, and releases oxygen when the ambience of the catalyst is in a rich condition. That is, the storage and release of oxygen can control the air-fuel ratio of the ambience of the catalyst toward stoichiometry, thereby preventing degradation of performance in purifying an exhaust gas. In addition, since this Ce-containing oxide alone is limited in storage/release amount of oxygen, a component promoting oxygen storage is loaded on the surface of the Ce-containing oxide. This component is, for example, Pt, Pd, or Rh.

Specifically, Pt, Pd, and Rh function not only as catalytic metals promoting oxidation of HC and CO and reduction of NOx, but also as components controlling the air-fuel ratio of the ambience of the three-way catalyst together with an oxygen storage/release material so as to allow the three-way catalyst to easily exhibit purification performance. However, since Pt, Pd, and Rh are scarce resources, it is required for a catalyst to exhibit a high exhaust-gas purification performance with reduced amount of Pt, Pd, and Rh.

In a known exhaust-gas purification catalytic system, three-way catalysts are disposed at an upstream side and a downstream side in an exhaust-gas flow in an exhaust passage of an engine. For example, in such a system, a so-called close-coupled catalyst coupled to a downstream end of an exhaust manifold and a so-called underfloor catalyst placed under the automobile floor at a downstream side in an exhaust-gas flow are used to purify an exhaust gas. In this catalytic system, the upstream close-coupled catalyst rapidly comes to have a temperature at which this close-coupled catalyst is active by heat of the exhaust gas, and therefore, is effective for purification of an exhaust gas discharged at, for example, a start-up of the engine and having a relatively low temperature. On the other hand, the downstream underfloor catalyst also has a temperature at which this underfloor catalyst is active around a time when a relatively large amount of a high-temperature exhaust gas is discharged from the engine. Accordingly, cooperation of the close-coupled catalyst and the underfloor catalyst can efficiently purify an exhaust gas.

A catalytic system constituted by upstream and downstream catalysts as described above is described in, for example, Japanese Patent Publication No. 2006-291918. Specifically, in this publication, a Rh-doped CeZr-based composite oxide is adopted as an oxygen storage/release material for an upstream catalyst, thereby achieving a structure in which the oxygen storage material for the upstream catalyst stores a larger amount of oxygen than that for the downstream catalyst under the same temperature. This structure is intended to reduce the size, or improve the layout, of the system while enhancing exhaust-gas purification performance and ensuring thermal resistance. This publication describes that enhancement of performance of the oxygen storage/release material for the upstream catalyst allows excellent exhaust-gas purification performance to be obtained even in a case where the air-fuel ratio of an exhaust gas varies in a wide range.

Japanese Patent Publication No. 2008-62156 describes that a material in which Rh is loaded on the surface of Rh-doped CeZrNd composite oxide is adopted as an oxygen storage/release material for a downstream catalyst, and an oxygen storage/release material capable of storing a smaller amount of oxygen than Rh-doped CeZrNd composite oxide is adopted for an upstream catalyst. This structure is intended to solve a problem in which Rh loaded on the surface of the Rh-doped CeZrNd composite oxide is oxidized by active oxygen released from this composite oxide with a variation of the air-fuel ratio to fail to return to a reduction state in which the catalyst activity is high. Specifically, Rh-loading Rh-doped CeZrNd composite oxide is adopted not for the upstream catalyst but for the downstream catalyst, and HC and CO flowing which have slipped through the upstream catalyst to flow toward a downstream side are used as reducing agents and Rh loaded on the surface of the Rh-doped CeZrNd composite oxide is maintained in a highly active state. In addition, activated alumina loading Pt is provided in the downstream catalyst such that HC described above is oxidized to be converted into, for example, CO having high reducing power, thereby activating (reducing) Rh.

The structure of the catalytic system in the above publication significantly enhances light-off characteristics (i.e., reducing the light-off temperature) for purification of HC, CO, and NOx and purification performance at high temperatures, thereby obtaining a high purification efficiency even in a case where the air-fuel ratio of an exhaust gas varies. However, in operation of automobiles, the air-fuel ratio of an exhaust gas might rapidly become a lean condition due to a fuel cut at deceleration in some cases. In such cases, purification of NOx degrades.

SUMMARY

It is therefore an object of the present disclosure to provide an exhaust-gas purification catalytic system including an upstream catalyst and a downstream catalyst and capable of efficiently purifying HC, CO, and NOx, irrespective of the level of the temperature of an exhaust gas even in a situation where the air-fuel ratio rapidly becomes a lean condition.

To achieve the above object, the present disclosure employs a configuration in which a catalyst layer of the downstream catalyst releases a larger amount of oxygen from an oxygen storage/release material than a catalyst layer of the upstream catalyst, and in which the oxygen storage/release material is often in contact with the exhaust gas.

Specifically, an exhaust-gas purification catalytic system according to the present disclosure includes an upstream catalyst and a downstream catalyst provided upstream and downstream, respectively, in a flow of exhaust gas in an exhaust passage of an engine, wherein each of the upstream catalyst and the downstream catalyst includes a plurality of catalyst layers stacked on a substrate, the plurality of catalyst layers of each of the upstream catalyst and the downstream catalyst include an upper catalyst layer containing an oxygen storage/release material in/on which a catalytic metal is included or loaded, a content of the oxygen storage/release material per 1 L of the substrate in the upper catalyst layer of the upstream catalyst is larger than that in the upper catalyst layer of the downstream catalyst, an oxygen release amount per a unit amount of a catalytic metal included in or loaded on the oxygen storage/release material for the upper catalyst layer of the downstream catalyst is larger than that for the upper catalyst layer of the upstream catalyst, and at least part of the oxygen storage/release material included in the upper catalyst layer of the downstream catalyst shows a particle size distribution having a peak particle size smaller than that included in the upper catalyst layer of the upstream catalyst.

In the structure described above, although the upper catalyst layer of the upstream catalyst has a larger amount of an oxygen storage/release material per 1 L of a substrate than the upper catalyst layer of the downstream catalyst, the upper catalyst layer of the downstream catalyst has a larger oxygen release amount per a unit amount of a catalytic metal than the upper catalyst layer of the upstream catalyst. That is, at least part of the oxygen storage/release material for the downstream catalyst has an oxygen storage capacity superior to that of the oxygen storage/release material for the upstream catalyst.

In a preferred embodiment, in an exhaust-gas temperature range from 350° C. to 500° C., both inclusive, an oxygen release amount per a unit amount of the catalytic metal of the oxygen storage/release material included in the upper catalyst layer of the downstream catalyst is 1.25 times as large as that in the upper catalyst layer of the upstream catalyst or more.

The structure in which at least part of the oxygen storage/ release material included in the upper catalyst layer of the downstream catalyst shows a particle size distribution having a peak particle size smaller than that included in the upper catalyst layer of the upstream catalyst, means that the oxygen storage/release material for the downstream catalyst is more often in contact with an exhaust gas than the oxygen storage/ release material for the upstream catalyst. Preferably, the oxygen storage/release material for the upstream catalyst shows a particle size distribution whose peak is in the particle size range from 550 nm to 1200 nm, both inclusive, and the oxygen storage/release material for the downstream catalyst shows a particle size distribution whose peak is in a particle size range (e.g., from 100 nm to 300 nm, both inclusive) smaller than that for the upstream catalyst.

Accordingly, in a situation where the air-fuel ratio rapidly becomes a lean condition as in deceleration of an automobile, an exhaust gas which cannot be purified in the upper catalyst layer of the upstream catalyst can be efficiently purified by a catalytic metal included in or loaded on the oxygen storage/ release material for the upper catalyst layer of the downstream catalyst, or another catalytic metal added as necessary. Specifically, when the air-fuel ratio rapidly becomes a lean condition, the oxygen storage/release material for the downstream catalyst which has an excellent oxygen storage capacity and is often in contact with the exhaust gas can efficiently store oxygen in the exhaust gas, and thus, the air-fuel ratio of the exhaust gas around the downstream catalyst is less likely to become an excessive lean condition, thereby facilitating purification of the exhaust gas, particularly NOx.

In addition, the oxygen storage/release material for the upstream catalyst has an oxygen storage/release capacity lower than that of the oxygen storage/release material for the downstream catalyst. Thus, it is possible to prevent a large amount of active oxygen from being released from the oxygen storage/release material in the upstream catalyst when the air-fuel ratio of the exhaust gas becomes a rich condition. Accordingly, HC and CO in the exhaust gas are not oxidized by the upstream catalyst, and slips through this upstream catalyst to be easily supplied to the downstream catalyst. Consequently, the catalytic metal included in or loaded on the oxygen storage/release material for the downstream catalyst is activated (reduced) by HC and CO slipped through the upstream catalyst even when the catalytic metal is oxidized by active oxygen released from the oxygen storage/release material while the air-fuel ratio is becoming a rich condition. In addition, unlike the upstream catalyst exposed to a high-temperature exhaust gas from an engine, the downstream catalyst has a small heat load to show a small degree of thermal degradation (sintering) of the oxygen storage/release material and the catalytic metal, and thus, is advantageous in superior oxygen storage capacity described above and obtaining good contact with the exhaust gas.

On the other hand, in a situation where the air-fuel ratio of an exhaust gas does not rapidly become a lean condition as in steady driving or acceleration of an automobile, the upper catalyst layer of the upstream catalyst also effectively functions for purification of the exhaust gas, and together with the upper catalyst layer of the downstream catalyst, can efficiently purify the exhaust gas.

Among the plurality of catalyst layers, an upper catalyst layer can be more easily in contact with an exhaust gas. Thus, the oxygen storage materials for the upper catalyst layers of the upstream catalyst and the downstream catalyst configured described above can efficiently purify the exhaust gas, including a case where the air-fuel ratio of the exhaust gas rapidly becomes a lean condition.

In this case, the upper catalyst layer of each of the upstream catalyst and the downstream catalyst is preferably a catalyst layer containing Rh as a catalytic metal and not containing Pd, and the lower catalyst layer of each of the upstream catalyst and the downstream catalyst is preferably a catalyst layer containing Pd as a catalytic metal and not containing Rh. This structure is advantageous in preventing alloying between Pd and Rh, and makes the lower catalyst layer protected by the upper catalyst layer to be also advantageous in preventing thermal degradation of Pd in the lower catalyst layer and poisoning with sulfur or phosphorus.

In a preferred embodiment, at least part of the oxygen storage/release material included in the upper catalyst layer of the upstream catalyst is made of Rh-loading CeZr-based composite oxide containing Ce and Zr and loading Rh thereon, and at least part of the oxygen storage/release material included in the upper catalyst layer of the downstream catalyst is made of Rh-doped CeZr-based composite oxide containing Ce and Zr and also containing Rh dissolved therein.

Specifically, Rh-doped CeZr-based composite oxide obtained by dissolving Rh therein has a larger oxygen storage/release amount and a higher oxygen storage/release speed than Rh-loading CeZr-based composite oxide. This is assumed to be because of the following reasons. In the case of the Rh-doped CeZr-based composite oxide, Rh present between crystal lattice points or lattice points of this oxide helps movement of oxygen ions from the oxide surface into the inside of the oxide and movement of oxygen ions from the inside of the oxide to the oxide surface.

In a preferred embodiment, the upper catalyst layer of the downstream catalyst including the oxygen storage/release material further includes a catalytic component in which ZrLa-based composite oxide containing Zr and La is loaded on activated alumina and Rh is loaded on the ZrLa-based composite oxide, and at least part of the oxygen storage/release material included in the upper catalyst layer of the downstream catalyst constitutes at least part of a binder in the upper catalyst layer of the downstream catalyst.

Specifically, as described above, at least part of the oxygen storage/release material included in the upper catalyst layer of the downstream catalyst has an average particle size smaller than that of the oxygen storage/release material included in the upper catalyst layer of the upstream catalyst. Thus, this oxygen storage/release material with small particle sizes is used as a binder for binding catalyst particles in the upper catalyst layer of the downstream catalyst to bind this upper catalyst layer to a substrate or another catalyst layer. Accordingly, the amount of a dedicated material for a binder, e.g., an alumina binder or a zirconia binder, can be reduced to a smaller value or zero. That is, it is possible to reduce the volume of the entire upper catalyst layer to reduce the thermal capacity. As a result, an early temperature rise (activation) of the upper catalyst layer can be advantageously achieved.

In addition, since activated alumina has a high thermal resistance and a large specific surface area, the activated alumina can load Rh in a high dispersion state, and can advantageously enhance the catalyst activity. However, if the upper catalyst layer is often exposed to high temperatures, Rh is dissolved in alumina to be gradually deactivated with time. In contrast, in the case of the above catalyst particles in which ZrLa-based composite oxide is loaded on the activated alumina and Rh is loaded on the ZrLa-based composite oxide, Rh can be loaded on the activated alumina in a high dispersion state with the ZrLa-based composite oxide interposed therebetween, and in addition, dissolution of Rh in the activated alumina is prevented by the ZrLa-based composite oxide. Thus, this structure can advantageously reduce the deactivation described above.

In addition, Rh on the ZrLa-based composite oxide is not significantly reduced and is kept in an appropriately oxidized state even when the air-fuel ratio of an exhaust gas changes from a lean condition to a rich condition. Specifically, it is expected that Rh loaded on ZrLa-based composite oxide causes bonding of La—O—Rh between this ZrLa composite oxide and Rh, and Rh is easily in an oxidized state due to the function of La. Consequently, although reduction of Rh is disadvantageous for oxidation of HC and CO, Rh on the ZrLa composite oxide is appropriately oxidized even when the air-fuel ratio becomes a rich condition, and thus, HC oxidation power and CO oxidation power do not significantly degrade. In addition, since HC and CO are oxidized even in a rich condition, NOx reduction proceeds with these oxidations, and thus, NOx can be advantageously reduced and purified.

The ZrLa-based composite oxide preferably further contains an alkali earth metal in addition to Zr and La. Specifically, oxides of Zr and La are basic, and an alkali earth metal is more strongly basic than these oxides. Accordingly, various basic sites having different intensities are formed in the ZrLa-based composite oxide, and adsorption and purification of exhaust gas components are efficiently performed. As a result, an exhaust gas can be advantageously purified.

The alkali earth metal described above is preferably Mg, Ca, or Sr, each of which is easily dissolved in $ZrO_2$. Among these elements, Sr which is strongly basic is especially preferable. Two or more these alkali earth metals may be included.

DETAILED DESCRIPTION

Embodiments of the present disclosure will be described hereinafter with reference to the drawings. Note that the following description of the preferred embodiments is merely illustrative in nature, and is not intended to limit the scope, applications, and use of the present disclosure.

Figure 1:
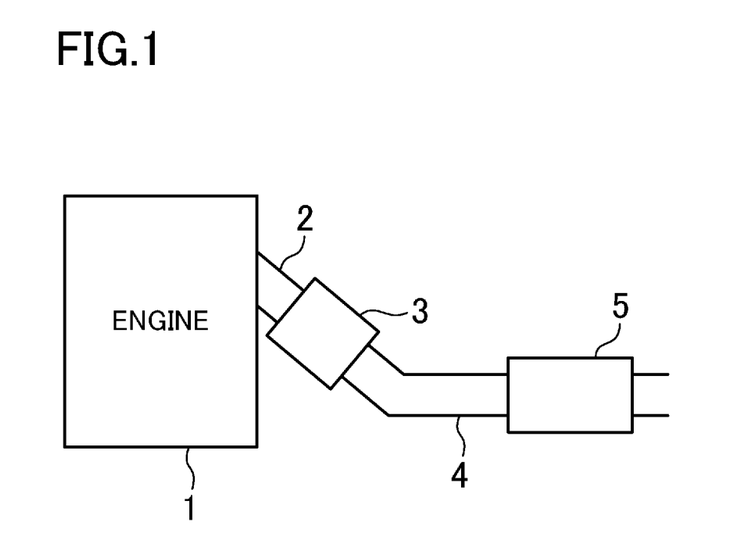
FIG. 1 is a view illustrating an exhaust-gas purification catalytic system according to an embodiment of the present disclosure.

In an inventive exhaust-gas purification catalytic system illustrated in FIG. 1, reference character 1 denotes an engine of an automobile, reference character 2 denotes an exhaust manifold, reference character 3 denotes an upstream catalyst directly coupled to a downstream end of the exhaust manifold 2, reference character 4 denotes an exhaust pipe extending rearward of the automobile from the upstream catalyst 3, and reference character 5 denotes a downstream catalyst provided in the exhaust pipe 4 under the floor of the automobile. That is, the upstream catalyst 3 and the downstream catalyst 5 are separately disposed at upstream and downstream, respectively, in a flow of an exhaust gas in an exhaust passage of the engine 1.

Figure 2:
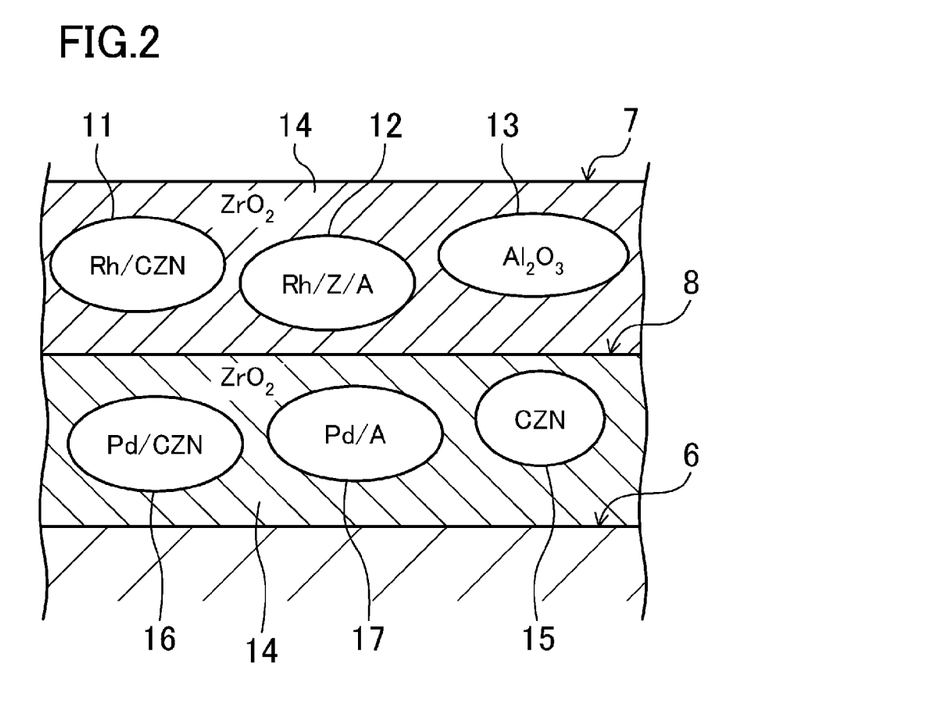
FIG. 2 is a view illustrating a structure of an upstream catalyst of the purification catalytic system.

FIG. 2 is a view schematically illustrating a structure of the upstream catalyst 3. In FIG. 2, reference character 6 denotes a cell wall of a honeycomb substrate. An upper catalyst layer 7 and a lower catalyst layer 8 are stacked on the cell wall 6. The surface of the upper catalyst layer 7 constitutes an exhaust gas passage of the honeycomb substrate 6.

The upper catalyst layer 7 contains Rh-loading CeZrNd composite oxide (Rh/CZN) 11, Rh-loading ZrLa-based composite oxide covered alumina (Rh/Z/A) 12, and activated alumina ($Al_2O_3$) 13, and also contains a zirconia binder ($ZrO_2$) 14. In this upper catalyst layer 7, the Rh-loading CeZrNd composite oxide 11 is used as an oxygen storage/release material loading a catalytic metal.

Figure 3:
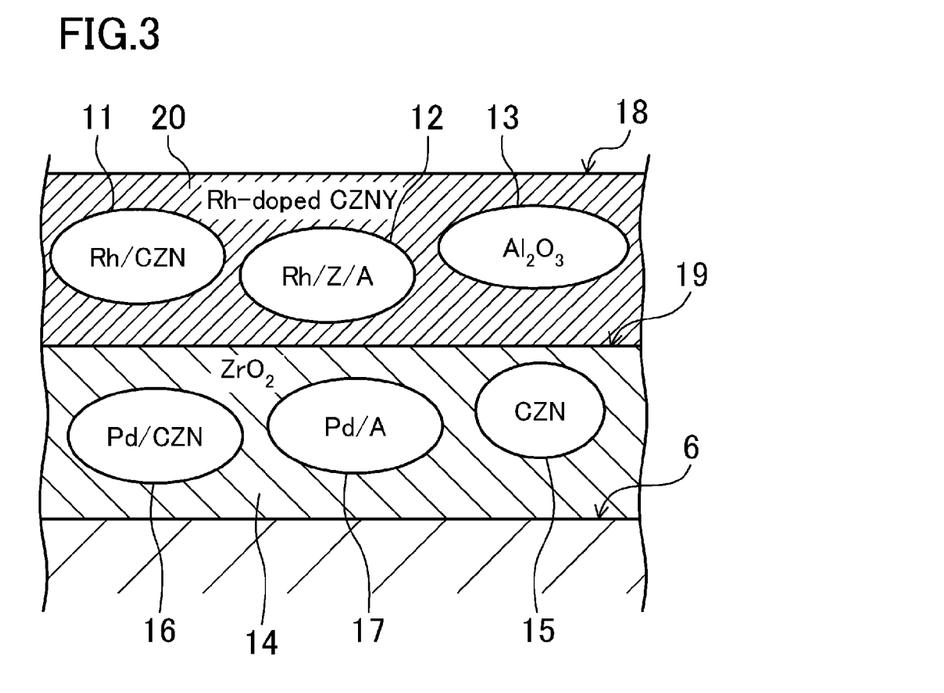
FIG. 3 is a view illustrating a structure of a downstream catalyst of the purification catalytic system.

The lower catalyst layer 8 contains CeZrNd composite oxide (CZN) 15, Pd-loading CeZrNd composite oxide (Pd/CZN) 16, and Pd-loading activated alumina (Pd/A) 17, and also contains a zirconia binder ($ZrO_2$) 14. The CeZrNd composite oxide 15 and the Pd-loading CeZrNd composite oxide 16 of the lower catalyst layer 8 also have oxygen storage/release capacities FIG. 3 is a view schematically illustrating a structure of the downstream catalyst 5. In a method similar to the upstream catalyst 3, the downstream catalyst 5 includes an upper catalyst layer 18 and a lower catalyst layer 19 stacked on a cell wall 6 of a honeycomb substrate. The surface of the upper catalyst layer 18 constitutes an exhaust gas passage of the honeycomb substrate 6.

The upper catalyst layer 18 contains Rh-loading CeZrNd composite oxide (Rh/CZN) 11, Rh-loading ZrLa-based composite oxide covered alumina (Rh/Z/A) 12, and activated alumina ($Al_2O_3$) 13 in a method similar to the upstream catalyst 3, and, unlike the upstream catalyst 3, contains Rh-doped CeZrNdY composite oxide (Rh-doped CZNY) 20 having a particle size smaller than those of other catalyst particles.

In the upper catalyst layer 18, the Rh-loading CeZrNd composite oxide 11 and the Rh-doped CeZrNdY composite oxide (small particles) 20 are used as oxygen storage/release materials each loading or including a catalytic metal. In particular, the Rh-doped CeZrNdY composite oxide (small particles) 20 also serves as a binder material. The Rh-doped CeZrNdY composite oxide (small particles) 20 is obtained by wet grinding Rh-doped CeZrNdY composite oxide prepared by coprecipitation to have a reduced particle size. This process will be described later.

In a method similar to the upstream catalyst 3, the lower catalyst layer 19 contains CeZrNd composite oxide (CZN) 15, Pd-loading CeZrNd composite oxide (Pd/CZN) 16, and Pd-loading activated alumina (Pd/A) 17, and also contains a zirconia binder ($ZrO_2$) 14.

A feature of the catalytic system is to adopt the Rh-doped CeZrNdY composite oxide (small particles) 20 as an oxygen storage/release material including a catalytic metal and a binder material in the upper catalyst layer 18 of the downstream catalyst 5. This Rh-doped CeZrNdY composite oxide (small particles) is prepared using coprecipitation and wet grinding in the following method.

Specifically, cerium nitrate hexahydrate, a zirconyl oxynitrate solution, neodymium nitrate hexahydrate, yttrium nitrate hexahydrate, and a rhodium nitrate solution are dissolved in ion-exchanged water. In this nitrate solution, an 8-fold dilution of 28 mass % of aqueous ammonia is mixed and neutralized, thereby obtaining a coprecipitate. This coprecipitate is washed by centrifugation, dried in the air at 150° C. for 24 hours, grinded, and then held in the air at 500° C. for two hours, thereby obtaining powder of Rh-doped CeZrNdY composite oxide (large particles).

Then, ion-exchanged water is added to the powder of Rh-doped CeZrNdY composite oxide (large particles), thereby producing slurry (having a solid content of 25 mass %). This slurry is then placed in a ball mill, and is ground (wet ground for about three hours) with zirconia beads each having a diameter of 0.5 mm. In this method, a sol in which powder of Rh-doped CeZrNdY composite oxide (small particles) having a reduced particle size is dispersed is obtained. This sol is used as an oxygen storage/release material and a binder material for the upper catalyst layer 18 of the downstream catalyst 5.

<Particle Size Distribution of Oxygen Storage/Release Material>

Figure 4:
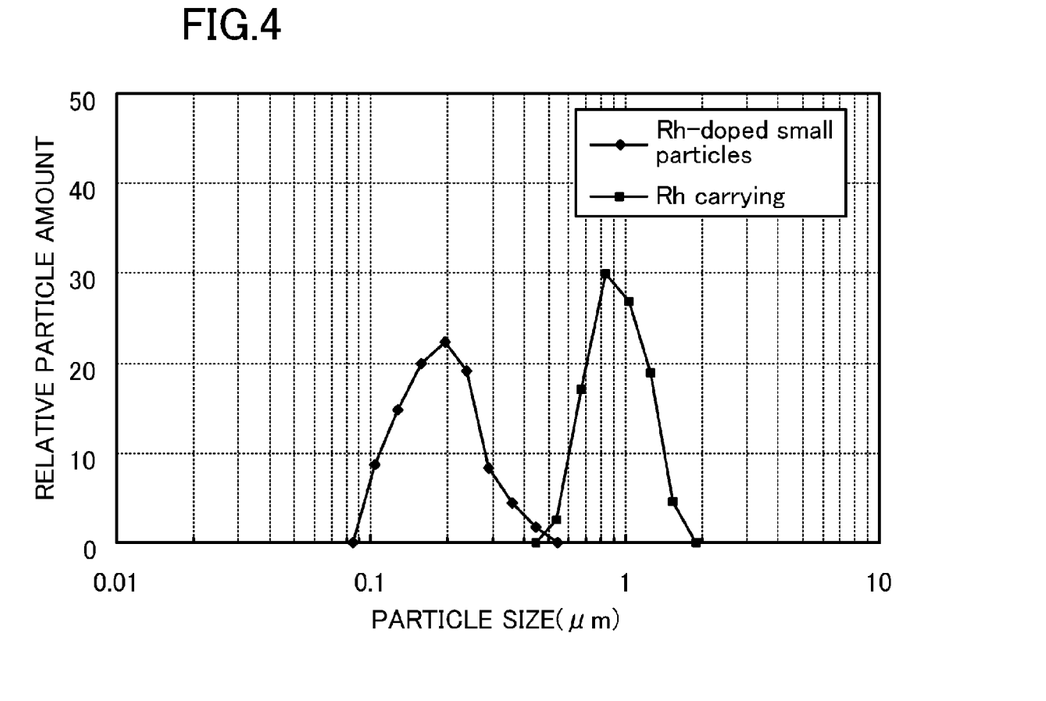
FIG. 4 is a graph showing particle size distributions of two oxygen storage/release materials.

FIG. 4 shows a particle size distribution (a frequency distribution) of the Rh-doped CeZrNdY composite oxide (small particles) 20 (indicated as "Rh-doped small particles" in FIG. 4) and the Rh-loading CeZrNd composite oxide 11 (indicated as "Rh-loading" in FIG. 4). To measure the particle size distribution, a laser diffraction particle size distribution analyzer produced by SHIMADZU CORPORATION was used.

The Rh-doped CeZrNdY composite oxide (small particles) 20 has a peak in the particle size range from 100 nm to 300 nm, both inclusive. The Rh-loading CeZrNd composite oxide 11 has a peak in the particle size range from 550 nm to 1200 nm, both inclusive. In the Rh-doped CeZrNdY composite oxide (small particles) 20, the particle size in cumulative distribution for 10 mass % is 109 nm, the particle size in cumulative distribution for 50 mass % is 184 nm, and the particle size in cumulative distribution for 90 mass % is 287 nm. That is, the particle size in cumulative distribution for 10 mass % is 100 nm or more, and the particle size in cumulative distribution for 90 mass % is 300 nm or less. In the Rh-loading CeZrNd composite oxide 11, the particle size in cumulative distribution for 10 mass % is 576 nm, the particle size in cumulative distribution for 50 mass % is 848 nm, and the particle size in cumulative distribution for 90 mass % is 1160 nm. That is, the particle size in cumulative distribution for 10 mass % is 550 nm or more, and the particle size in cumulative distribution for 90 mass % is 1200 nm or less. The Rh-doped CeZrNdY composite oxide (large particles) before wet grinding has a particle size distribution similar to that of the Rh-loading CeZrNd composite oxide 11.

<Oxygen Storage Speed>

Rh-doped CeZrNdY composite oxide (large particles) as an oxygen storage/release material and Rh-doped CeZrNdY composite oxide (small particles) obtained by wet grinding the Rh-doped CeZrNdY composite oxide (large particles) were subjected to thermal aging (in an atmospheric environment at 1000° C. for 24 hours). Then, the oxygen storage speeds of these oxides in an oxygen-rich atmosphere were measured. In this measurement, a certain amount of a powder sample (a mixture of an oxygen storage/release material and activated alumina at a mass ratio of 10:90) in a glass tube was kept at 500° C., and 5 ms of an $O_2$ pulse was generated at every 60 seconds with air steadily exhausted. This process was performed in several cycles. Then, 10 ms of a CO pulse was generated with a delay of 30 seconds from the $O_2$ pulse generation. During these pulse generations, a change with time in signal intensity ($O_2$ amount) of mass number 32 in each cycle was measured by a mass analyzer. In this method, a change with time in signal intensity before the CO pulse and a change with time in signal intensity after the CO pulse were obtained. In this case, a difference between the signal intensity before the CO pulse and the signal intensity after the CO pulse is generated because the sample stores oxygen. Accordingly, the oxygen storage amount is obtained by subtracting the signal intensity after the CO pulse from the signal intensity before the CO pulse. Using this oxygen storage amount, the oxygen storage speed (per a unit time, the storage amount per a unit amount) is obtained. In this sample, oxygen is stored while oxygen previously stored is released in practice. Thus, the oxygen storage speed here is an apparent oxygen storage speed.

Figure 5:
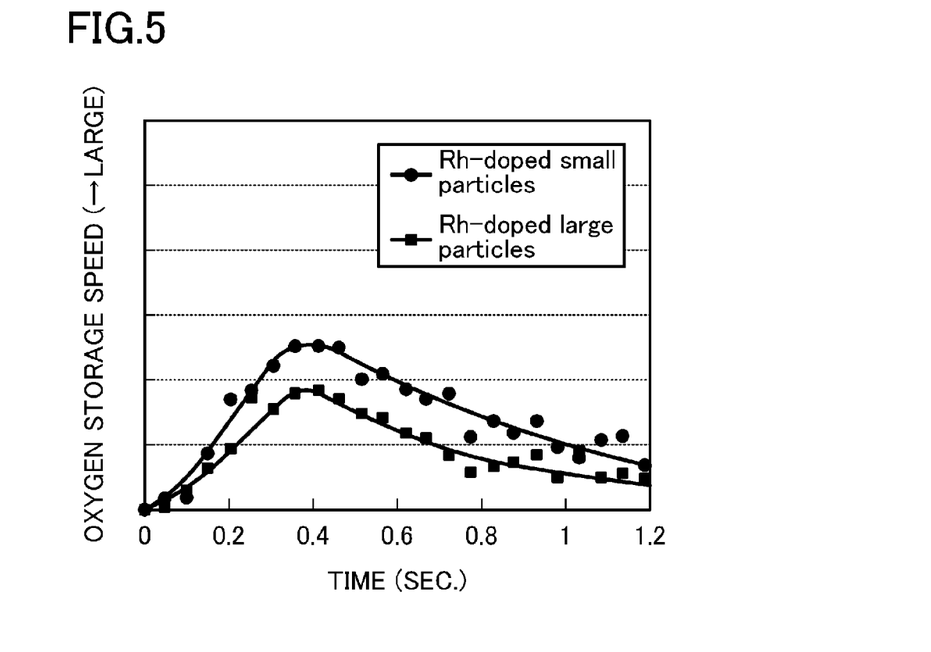
FIG. 5 is a graph showing changes with time in oxygen storage speeds of two oxygen storage/release materials.

FIG. 5 shows changes with time in oxygen storage speeds of Rh-doped CeZrNdY composite oxide (small particles) (indicated as "Rh-doped small particles" in FIG. 5) and Rh-doped CeZrNdY composite oxide (large particles) (indicated as "Rh-doped large particles" in FIG. 5). The oxygen storage speed of the small particles is higher than that of the large particles.

Figure 6:
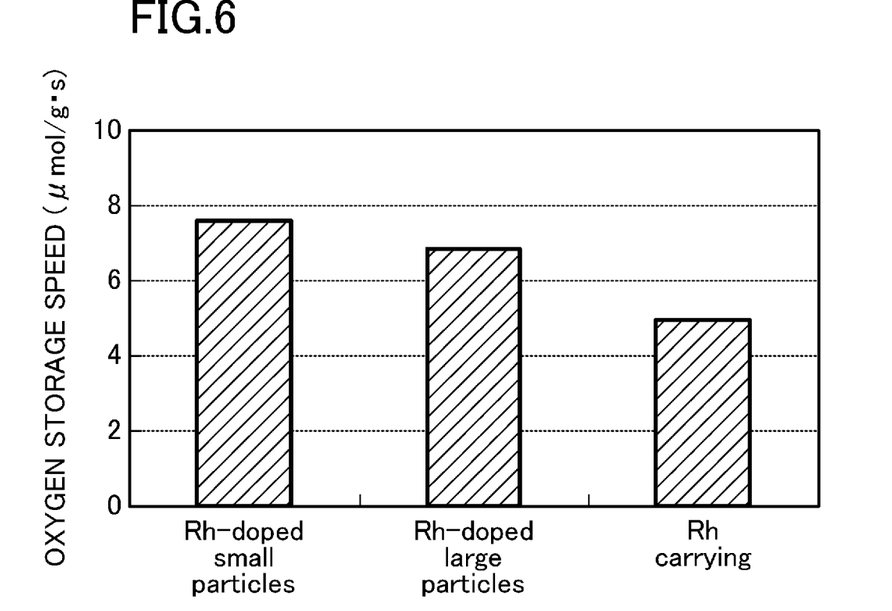
FIG. 6 is a graph showing the oxygen storage speeds of three oxygen storage/release materials.

In the same method, the oxygen storage speed of Rh-loading CeZrNdY composite oxide ("Rh-loading") was also measured. FIG. 6 shows the average oxygen storage speeds for 0.5 seconds from the start of measurement of the Rh-doped CeZrNdY composite oxide ("Rh-doped small particles"), the Rh-doped CeZrNdY composite oxide ("Rh-doped large particles"), and the Rh-loading CeZrNdY composite oxide ("Rh-loading"). The oxygen storage speed of the Rh-loading CeZrNdY composite oxide ("Rh-loading") is lower than that of the Rh-doped CeZrNdY composite oxide ("Rh-doped large particles").

Example 1

A catalytic system was formed in the following method using a ceramic honeycomb substrate (with a capacity of about 1 L) having a cell-wall thickness of 3.5 mil ($8.89 \times 10^{-2}$ mm) and including 600 cells per square inch (645.16 mm$^2$) as the upstream catalyst 3, and a ceramic honeycomb substrate (with a capacity of about 1 L) having a cell-wall thickness of 4.5 mil ($11.43 \times 10^{-2}$ mm) and including 400 cells per square inch (645.16 mm$^2$) as the downstream catalyst 5.

—Upper Catalyst Layer 7 of Upstream Catalyst 3—

As the Rh-loading CeZrNd composite oxide 11, CeZrNd composite oxide ($CeO_2:ZrO_2:Nd_2O_3=10:80:10$ (mass ratio)) loading Rh by an evaporation to dryness method was adopted. The content of the Rh-loading CeZrNd composite oxide 11 per 1 L of a substrate was 90 g (including 0.33 g of Rh). The particle size distribution thereof is indicated by "Rh-loading" in FIG. 4. This CeZrNd composite oxide was prepared by coprecipitation.

As the Rh-loading ZrLa-based composite oxide covered alumina 12, ZrLa composite oxide covered alumina loading Rh by an evaporation to dryness method was adopted. In the ZrLa composite oxide covered alumina, ZrLa composite oxide containing Zr and La was loaded on the surface of activated alumina, and was prepared in the following method. Specifically, activated alumina powder was dispersed in a mixed solution of zirconium nitrate and lanthanum nitrate, and aqueous ammonia was added to this mixed solution, thereby producing a precipitation. This precipitation was filtered, washed, dried at 200° C. for two hours, and calcined at 500° C. for two hours, thereby obtaining ZrLa composite oxide covered alumina powder. This ZrLa composite oxide covered alumina powder had a composition of $ZrO_2:La_2O_3:Al_2O_3=38:2:60$ (mass ratio). The content of the Rh-loading ZrLa-based composite oxide covered alumina per 1 L of a substrate was 30 g (including 0.125 g of Rh).

As the activated alumina 13, activated alumina containing 4 mass % of $La_2O_3$ was adopted. The content of this activated alumina per 1 L of a substrate was 12 g. The content of the zirconia binder 14 per 1 L of a substrate was 10 g.

—Lower Catalyst Layer 8 of Upstream Catalyst 3—

As the CeZrNd composite oxide 15, CeZrNd composite oxide prepared by coprecipitation and having a composition of $CeO_2:ZrO_2:Nd_2O_3=23:67:10$ (mass ratio) was adopted. The content of this CeZrNd composite oxide per 1 L of a substrate was 10 g. As the Pd-loading CeZrNd composite oxide 16, CeZrNd composite oxide ($CeO_2:ZrO_2:Nd_2O_3=23:67:10$ (mass ratio)) prepared by coprecipitation and loading Pd by an evaporation to dryness method was adopted. The content of this CeZrNd composite oxide per 1 L of a substrate was 35 g (including 0.28 g of Pd). As the Pd-loading activated alumina 17, activated alumina containing 4 mass % of $La_2O_3$ and loading Pd by an evaporation to dryness method was adopted. The content of this activated alumina per 1 L of a substrate was 45 g (including 4.265 g of Pd). The content of the zirconia binder 14 per 1 L of a substrate was 10 g.

—Upper Catalyst Layer 18 of Downstream Catalyst 5—

As the Rh-loading CeZrNd composite oxide 11, the Rh-loading ZrLa-based composite oxide covered alumina 12, and the activated alumina 13, materials similar to those included in the upper catalyst layer 7 of the upstream catalyst 3 were adopted. The content of the Rh-loading CeZrNd composite oxide 11 per 1 L of a substrate was 70 g (including 0.242 g of Rh). The content of the Rh-loading ZrLa-based composite oxide covered alumina 12 per 1 L of a substrate was 30 g (including 0.085 g of Rh). The content of the activated alumina 13 per 1 L of a substrate was 10 g.

As the Rh-doped CeZrNdY composite oxide (small particles) 20, CeZrNdY composite oxide ($CeO_2:ZrO_2:Nd_2O_3:Y_2O_3=10:80:5:5$ (mass ratio)) doped with Rh was adopted. This CeZrNdY composite oxide was prepared in the method described above. The content of the CeZrNdY composite oxide per 1 L of a substrate was 12 g (including 0.006 g of Rh). In the upper catalyst layer 18, a sol of the above Rh-doped CeZrNdY composite oxide was used as a binder.

—Lower Catalyst Layer 19 of Downstream Catalyst 5—

As the CeZrNd composite oxide 15, the Pd-loading CeZrNd composite oxide 16, and the Pd-loading activated alumina 17, materials similar to those included in the lower catalyst layer 8 of the upstream catalyst 3 were adopted. The content of the CeZrNd composite oxide 15 per 1 L of a substrate was 20 g. The content of the Pd-loading CeZrNd composite oxide 16 per 1 L of a substrate was 35 g (including 0.194 g of Pd). The content of the Pd-loading activated alumina 17 per 1 L of a substrate was 45 g (including 1.473 g of Pd). The content of the zirconia binder 14 per 1 L of a substrate was 10 g.

The contents of components of the upstream catalyst 3 and the downstream catalyst 5 of Example 1 per 1 L of a substrate are shown in Table 1. The content of the oxygen storage/release material (Rh-loading CeZrNd composite oxide) for the upper catalyst layer of the upstream catalyst per 1 L of a substrate was 90 g, and is larger than the total content, i.e., 82 g, of the oxygen storage/release materials (Rh-loading CeZrNd composite oxide and Rh-doped CeZrNdY composite oxide (small particles)) for the upper catalyst layer of the downstream catalyst per 1 L of a substrate.

TABLE 1

| | | | Example 1 |
|---|---|---|---|
| | | | Content |
| upstream catalyst | upper catalyst layer | Rh-loading CeZrNd composite oxide | 90.000 g/L (Rh = 0.330 g/L) |
| | | Rh-loading ZrLa composite oxide covered alumina | 30.000 g/L (Rh = 0.125 g/L) |
| | | activated alumina | 12.000 g/L |
| | | zirconia binder | 10.000 g/L |
| | lower catalyst layer | CeZeNd composite oxide | 10.000 g/L |
| | | Pd-loading CeZrNd composite oxide | 35.000 g/L (Pd = 0.280 g/L) |
| | | Pd-loading activated alumina | 45.000 g/L (Pd = 4.265 g/L) |
| | | zirconia binder | 10.000 g/L |

TABLE 1-continued

Example 1

| | | | Content |
|---|---|---|---|
| downstream catalyst | upper catalyst layer | Rh-loading CeZrNd composite oxide | 70.000 g/L (Rh = 0.242 g/L) |
| | | Rh-loading ZrLa composite oxide covered alumina | 30.000 g/L (Rh = 0.085 g/L) |
| | | activated alumina | 10.000 g/L |
| | | Rh-doped CeZrNdY composite oxide (small particles) | 12.000 g/L (Rh = 0.006 g/L) |
| | lower catalyst layer | CeZrNd composite oxide | 20.000 g/L |
| | | Pd-loading CeZrNd composite oxide | 35.000 g/L (Pd = 0.194 g/L) |
| | | Pd-loading activated alumina | 45.000 g/L (Pd = 1.473 g/L) |
| | | zirconia binder | 10.000 g/L |

Example 2

A catalytic system was formed in the same method as in Example 1 except that Rh-loading ZrLaSr composite oxide covered alumina containing an alkali earth metal Sr was adopted instead of Rh-loading ZrLa composite oxide covered alumina for the upper catalyst layer 18 of the downstream catalyst 5. This ZrLaSr composite oxide covered alumina had a composition of $ZrO_2:La_2O_3:SrO:Al_2O_3=38:2:1.5:58.5$ (mass ratio).

The contents of components of the upstream catalyst 3 and the downstream catalyst 5 of Example 2 are shown in Table 2.

TABLE 2

Example 2

| | | | Content |
|---|---|---|---|
| upstream catalyst | upper catalyst layer | The same as in Example 1 (Table 1) | |
| | lower catalyst layer | The same as in Example 1 (Table 1) | |
| downstream catalyst | upper catalyst layer | Rh-loading CeZrNd composite oxide | 70.000 g/L (Rh = 0.242 g/L) |
| | | Rh-loading ZrLaSr composite oxide covered alumina | 30.000 g/L (Rh = 0.085 g/L) |
| | | activated alumina | 10.000 g/L |
| | | Rh-doped CeZrNdY composite oxide (small particles) | 12.000 g/L (Rh = 0.006 g/L) |
| | lower catalyst layer | The same as in Example 1 (Table 1) | |

Comparative Example 1

A catalytic system was formed in the same method as in Example 1 except that an alumina binder (whose content per 1 L of a substrate was 10 g) was adopted instead of Rh-doped CeZrNdY composite oxide for the upper catalyst layer 18 of the downstream catalyst 5, the content of the Rh-loading CeZrNd composite oxide 11 per 1 L of a substrate was changed to 82 g (including 0.248 g of Rh), and the content of the activated alumina 13 was zero.

The contents of components of the upstream catalyst 3 and the downstream catalyst 5 of Comparative Example 1 are shown in Table 3.

TABLE 3

Comparative Example 1

| | | | Content |
|---|---|---|---|
| upstream catalyst | upper catalyst layer | The same as in Example 1 (Table 1) | |
| | lower catalyst layer | The same as in Example 1 (Table 1) | |
| downstream catalyst | upper catalyst layer | Rh-loading CeZrNd composite oxide | 82.000 g/L (Rh = 0.248 g/L) |
| | | Rh-loading ZrLaSr composite oxide covered alumina | 30.000 g/L (Rh = 0.085 g/L) |
| | | activated alumina | 0.000 g/L |
| | | alumina binder | 10.000 g/L |
| | lower catalyst layer | The same as in Example 1 (Table 1) | |

Comparative Example 2

A catalytic system was formed in the same method as in Example 1 except that an alumina binder (whose content per 1 L of a substrate was 10 g) was adopted instead of Rh-doped CeZrNdY composite oxide for the upper catalyst layer 18 of the downstream catalyst 5, Rh-doped CeZrNdY composite oxide (large particles) was adopted instead of the Rh-loading CeZrNd composite oxide 11, and the content of the activated alumina 13 was zero. The Rh-doped CeZrNdY composite oxide (large particles) was obtained by doping CeZrNdY composite oxide (where $CeO_2:ZrO_2:Nd_2O_3:Y_2O_3=10:80:5:5$ (mass ratio)) with Rh, and was prepared by coprecipitation. Since the wet ground described above was not performed, The Rh-doped CeZrNdY composite oxide (large particles) has a particle size distribution similar to that of "Rh-loading" shown in FIG. 4. The content of the Rh-doped CeZrNdY composite oxide (large particles) per 1 L of a substrate was 82 g (including 0.248 g of Rh).

The contents of components of the upstream catalyst 3 and the downstream catalyst 5 of Comparative Example 2 are shown in Table 4.

TABLE 4

Comparative Example 2

| | | | Content |
|---|---|---|---|
| upstream catalyst | upper catalyst layer | The same as in Example 1 (Table 1) | |
| | lower catalyst layer | The same as in Example 1 (Table 1) | |
| downstream catalyst | upper catalyst layer | Rh-doped CeZrNdY composite oxide (large particles) | 82.000 g/L (Rh = 0.248 g/L) |
| | | Rh-loading ZrLaSr composite oxide covered alumina | 30.000 g/L (Rh = 0.085 g/L) |
| | | activated alumina | 0.000 g/L |
| | | alumina binder | 10.000 g/L |
| | lower catalyst layer | The same as in Example 1 (Table 1) | |

<Oxygen Storage/Release Amount>

Figure 7:
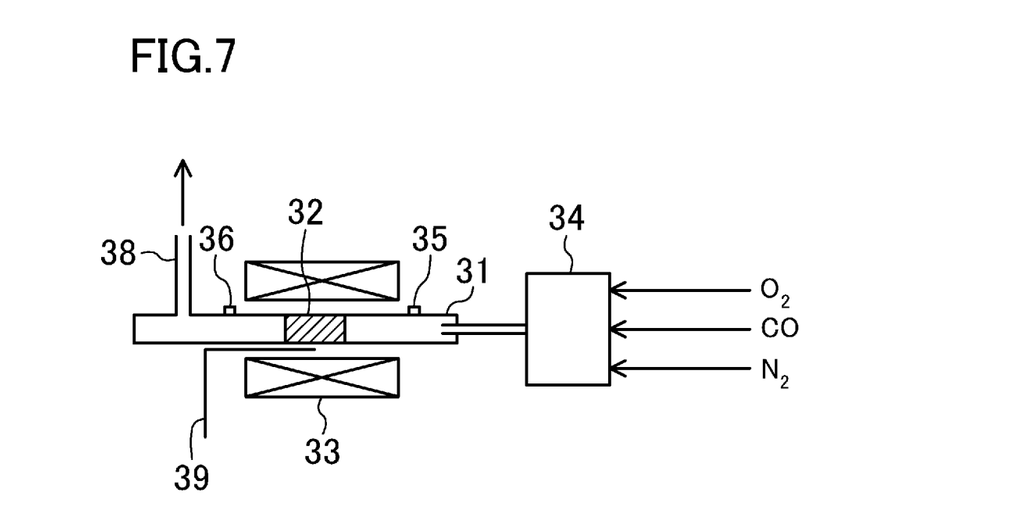
FIG. 7 is a view illustrating a configuration of a device for measuring the oxygen storage/release amount.

Sample materials (without lower catalyst layers) in each of which only the upper catalyst layer of one of the upstream catalyst of Example 1, the downstream catalyst of Example 1, and the downstream catalyst of Comparative Example 1 was formed on a substrate, were prepared. From each of these sample materials, a core sample having a substrate capacity of about 25 mL was cut out, and attached to a model gas flow reactor. Then, the oxygen storage/release amount was measured. FIG. 7 illustrates a configuration of a test device for measuring the oxygen storage/release amount. In FIG. 7, reference character 31 denotes a glass tube holding a sample 32, which is heated at a predetermined temperature by a heater 33. A pulse gas generator 34 capable of supplying pulses of an $O_2$ gas and a CO gas while supplying a base gas $N_2$ is connected to the glass tube 31 upstream of the sample 32. An exhaust part 38 is provided in the glass tube 31 downstream of the sample 32. In addition, A/F sensors (oxygen sensors) 35 and 36 are provided in the glass tube 31 upstream and downstream, respectively, of the sample 32. A thermocouple 39 for temperature control is attached to a sample-holding portion of the glass tube 31.

Figure 8:
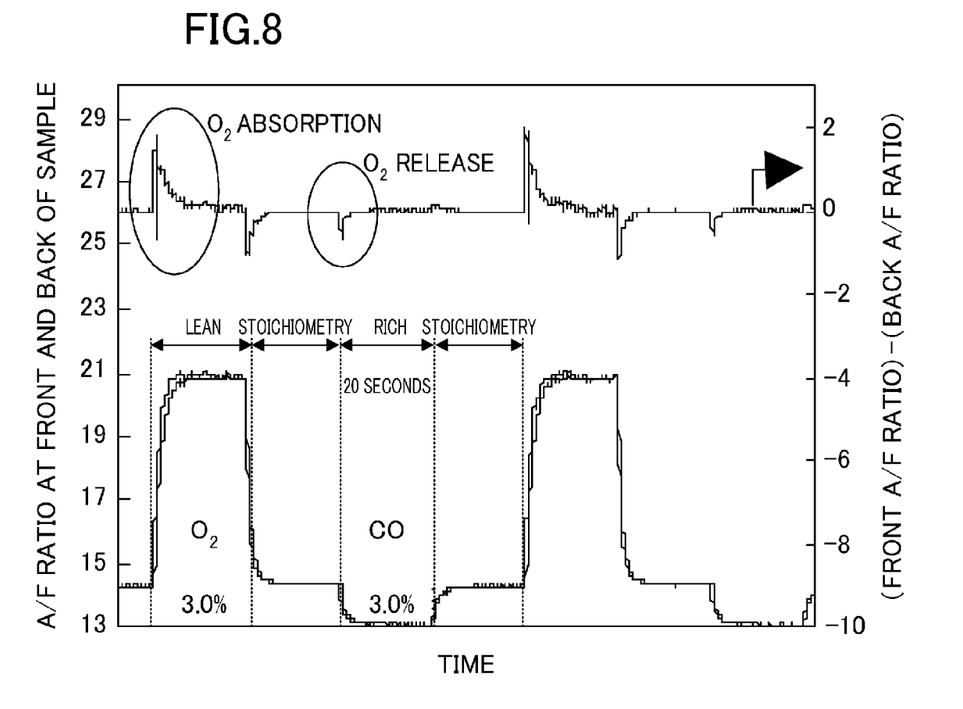
FIG. 8 is a graph showing changes with time in A/F values at the front and back of a sample and in A/F difference between the front and back of the sample in measurement of the oxygen storage/release amount.
Figure 9:
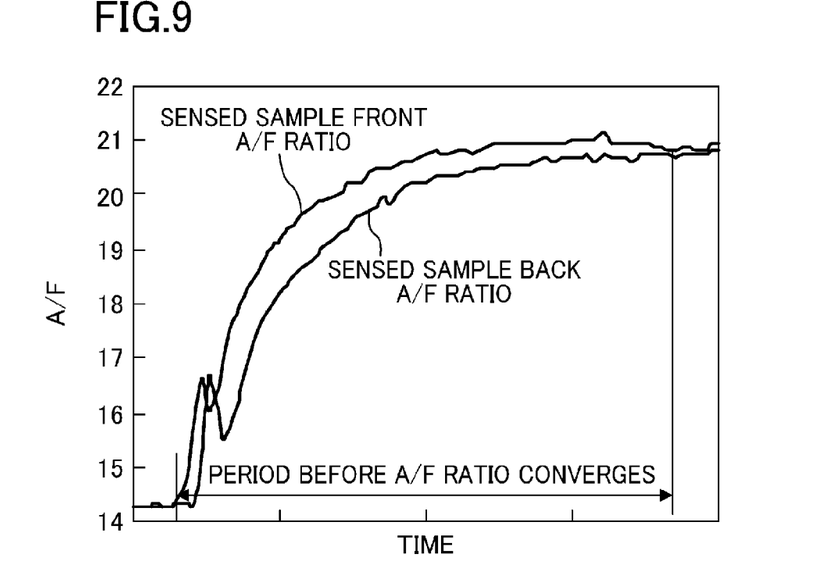
FIG. 9 is a graph showing changes with time in A/F difference between the front and back of a catalyst in measurement of the oxygen storage/release amount.

In measurement, as shown in FIG. 8, $O_2$ pulses (20 seconds) and CO pulses (20 seconds) were alternately generated at intervals (20 seconds) while the sample temperature in the glass tube 31 was kept at a predetermined level and a base gas $N_2$ was supplied to exhaust air through the exhaust part 38, thereby repeating cycles of lean→stoichiometry→rich→stoichiometry. As shown in FIG. 9, an output difference in A/F ratio (front A/F ratio−back A/F ratio) obtained by the A/F sensors 35 and 36 respectively at the front and back of the sample in a period immediately after switching from stoichiometry to rich before this output difference disappears was converted into an $O_2$ amount, and this $O_2$ amount was used as an $O_2$ release amount (an oxygen storage/release amount) of the sample. This $O_2$ release amount was measured at every 50° C. from 350° C. to 500° C.

In this method, the oxygen storage/release amount per a unit amount of Rh loaded on or included in the oxygen storage/release material in each sample was obtained. The oxygen storage/release material for the upstream catalyst of Example 1 was Rh-loading CeZrNd composite oxide (with an Rh content of 0.33 g/L). The oxygen storage/release materials of the downstream catalyst of Example 1 were Rh-loading CeZrNd composite oxide (with an Rh content of 0.242 g/L) and Rh-doped CeZrNdY composite oxide (with an Rh content of 0.006 g/L). Thus, the total Rh amount of the oxygen storage/release materials was 0.248 g/L. The oxygen storage/release material for the downstream catalyst of Comparative Example 1 was Rh-loading CeZrNd composite oxide (with an Rh content of 0.248 g/L).

Figure 10:
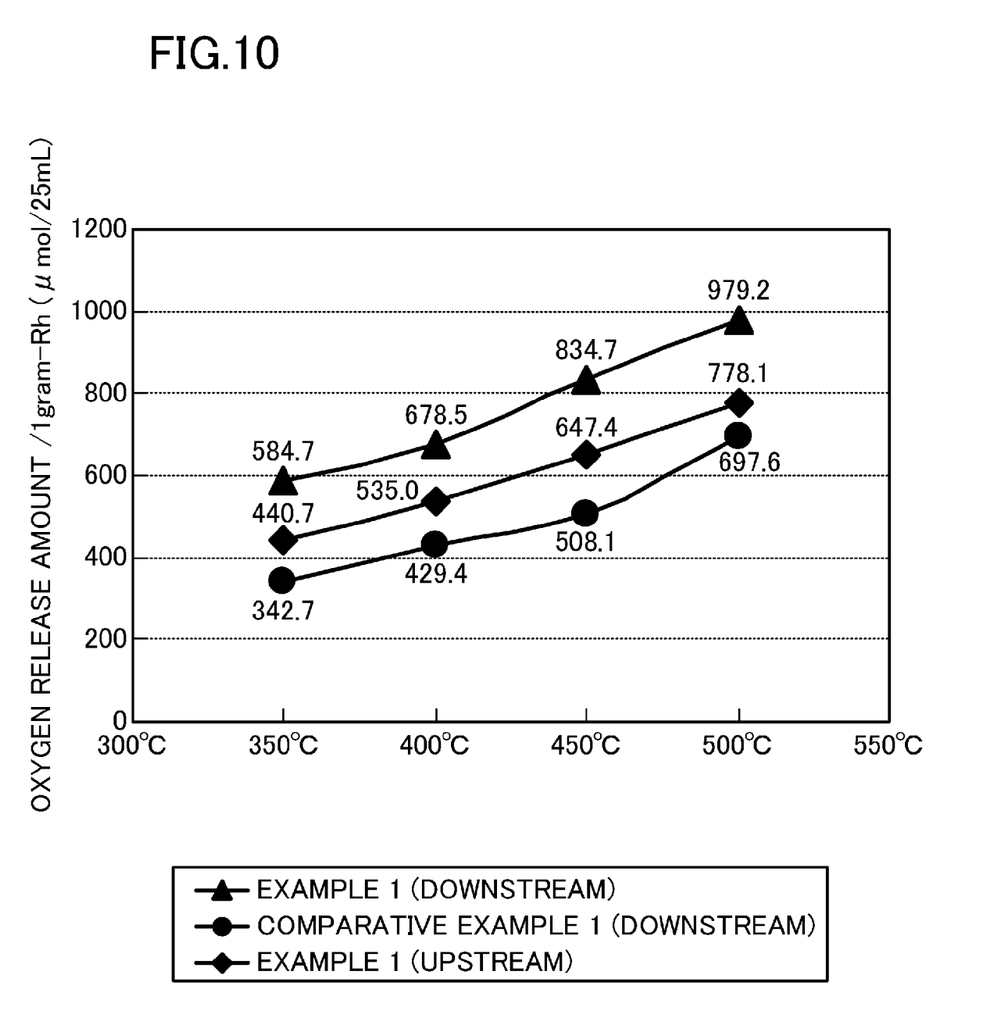
FIG. 10 is a graph showing temperature characteristics of the oxygen release amounts per a unit amount of Rh of three upper catalyst layers.

FIG. 10 shows the results of the above measurement. In the temperature range from 350° C. to 500° C., the oxygen storage/release amount per a unit amount of Rh was the largest in the downstream catalyst of Example 1, the second largest in the upstream catalyst of Example 1, and the third largest in the downstream catalyst of Comparative Example 1. The oxygen storage/release amount of the oxygen storage/release material for the downstream catalyst of Example 1 was 1.32 as large as that for the upstream catalyst of Example 1 or more at 350° C., and 1.25 as large as that for the upstream catalyst of Example 1 or more at 500° C.

FIG. 10 shows that in the downstream catalyst of Example 1, oxygen storage/release easily occurs even at low temperatures. The same phenomenon was observed in Example 2 in which the same oxygen storage/release material as that in Example 1 was used for the downstream catalyst. Specifically, in Examples 1 and 2, although the amount of the oxygen storage/release material (82 g/L as the total amount of Rh-loading CeZrNd composite oxide and Rh-doped CeZrNdY composite oxide (small particles)) for the upper catalyst layer of the downstream catalyst was smaller than that (90 g/L as the amount of Rh-loading CeZrNd composite oxide) of the upper catalyst layer of the upstream catalyst, the oxygen storage/release amount of the oxygen storage/release material for the upper catalyst layer of the downstream catalyst is larger than that of the upper catalyst layer of the upstream catalyst. This is largely because of the influence of the difference in total surface area due to the difference in particle size among oxygen storage/release materials, which will be described below.

<Specific Surface Area of Oxygen Storage/Release Material>

Rh-loading CeZrNd composite oxide used as the oxygen storage/release material for the upper catalyst layer of the upstream catalyst of Example 1 or 2 and Rh-doped CeZrNdY composite oxide (small particles) used as the oxygen storage/release material for the upper catalyst layer of the downstream catalyst have different particle size distributions as shown in FIG. 4. It was examined how the difference in particle size affects the contact between the oxygen storage/release material and an exhaust gas.

The frequency of contact between the oxygen storage/release material and an exhaust gas is generally evaluated by measuring the specific surface area by a BET method. However, the specific surface area obtained by this method is greatly affected by adsorption in pores in the case of a porous material, and thus, is not suitable for evaluation of the contact frequency due to the difference in particle size.

In view of this, heat treatment was performed in such a method that each of Rh-loading CeZrNd composite oxide and Rh-doped CeZrNdY composite oxide (small particles) was held at 1300° C. for four hours in an atmospheric environment, and a BET specific surface area was measured with the influence of each pore reduced (with pores considerably crushed). In addition, the specific surface area (a theoretical value without consideration of pores) of each of the Rh-loading CeZrNd composite oxide and the Rh-doped CeZrNdY composite oxide (small particles) was calculated based on the particle size distribution thereof on the assumption that these materials are spherical particles.

Table 5 shows the specific surface area and the total surface area of each of the oxygen storage/release materials (90 g/L of Rh-loading CeZrNd composite oxide) for the upper catalyst layers of the upstream catalysts of Examples 1 and 2 and Comparative Examples 1 and 2, the oxygen storage/release materials (70 g/L of Rh-loading CeZrNd composite oxide and 12 g/L of Rh-doped CeZrNdY composite oxide (small particles)) for the upper catalyst layers of the downstream catalysts of Examples 1 and 2, the oxygen storage/release material (82 g/L of Rh-loading CeZrNd composite oxide) for the upper catalyst layer of the downstream catalyst of Comparative Example 1, and the oxygen storage/release material (82 g/L of Rh-doped CeZrNdY composite oxide (large particles)) for the upper catalyst layer of the downstream catalyst of Comparative Example 2, obtained by the above two methods. Table 5 also shows the content of the oxygen storage/release material per a unit area on the surface of the honeycomb substrate on which the catalyst layer is loaded.

TABLE 5

| | oxygen storage/release material | | | BET method after heat treatment | | theoretical value in particle size distribution | |
|---|---|---|---|---|---|---|---|
| | type | content/ unit volume | content/ unit area | specific surface area | total surface area | specific surface area | total surface area |
| upper catalyst layer of upstream catalyst of Example 1, 2 and Comparative Example 1, 2 | Rh-loading CeZrNd composite oxide | 90.000 g/L | 25.47 g/m² | 3.4 m²/g | 306 m² | 0.86 m²/g | 77.22 m² |
| upper catalyst layer of downstream catalyst of Example 1, 2 | Rh-loading CeZrNd composite oxide | 70.000 g/L | 24.38 g/m² | 3.4 m²/g | 238 m² | 0.86 m²/g | 60.06 m² |
| | Rh-doped CeZrNdY composite oxide (small particles) | 12.000 g/L | 4.18 g/m² | 11.5 m²/g | 138 m² | 3.95 m²/g | 47.45 m² |
| | total | 82.000 g/L | 28.56 g/m² | — | 376 m² | — | 107.51 m² |
| upper catalyst layer of downstream catalyst of Comparative Example 1 | Rh-loading CeZrNd composite oxide | 82.000 g/L | 23.21 g/m² | 3.4 m²/g | 279 m² | 0.86 m²/g | 70.52 m² |
| upper catalyst layer of downstream catalyst of Comparative Example 2 | Rh-doped CeZrNdY composite oxide (large particles) | 82.000 g/L | 23.21 g/m² | 3.4 m²/g | 279 m² | 0.86 m²/g | 70.52 m² |

As shown in Table 5, in Examples 1 and 2, the upper catalyst layer of the downstream catalyst has a total amount (82 g/L) of the oxygen storage/release material smaller than the oxygen storage/release material amount (90 g/L) of the upper catalyst layer of the upstream catalyst, but has a total surface area larger than that of the upper catalyst layer of the upstream catalyst. This is because Rh-doped CeZrNdY composite oxide (small particles) having a large specific surface area is used as a part of the oxygen storage/release material for the downstream catalyst. Accordingly, the oxygen storage/release material for the upper catalyst layer of the downstream catalyst is more often in contact with an exhaust gas than the oxygen storage/release material for the upper catalyst layer of the upstream catalyst, as a whole.

On the other hand, although the upper catalyst layer of the downstream catalyst of Comparative Example 1, 2 has a total amount of the oxygen storage/release material of 82 g/L, which is equal to that of Example 1, 2, but has a small total surface area. This means that the oxygen storage/release material for the upper catalyst layer of the downstream catalyst of Comparative Example 1, 2 is less often in contact with an exhaust gas than that of Example 1, 2. This is because Rh-loading CeZrNd composite oxide or Rh-doped CeZrNdY composite oxide (large particles) having a large particle size is adopted.

The difference in total surface area among the oxygen storage/release materials (i.e., the frequency of contact with an exhaust gas) as described above is reflected in the difference in oxygen storage/release amount (i.e., an oxygen storage/release capacity can be obtained at lower temperature in Examples using oxygen storage/release materials with large specific surface areas than in Comparative Examples) between Examples and Comparative Examples shown in FIG. 10.

<NOx Purification Efficiency at Deceleration in FTP Mode>

Figure 11:
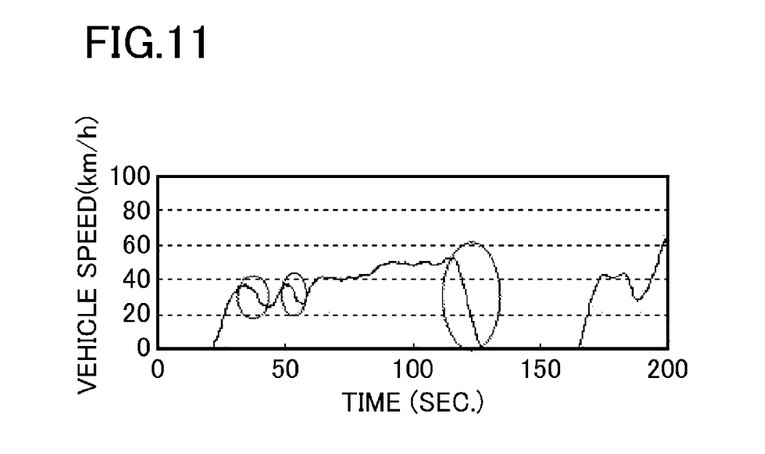
FIG. 11 is a graph showing part of an FTP mode (a driving mode of an automobile in an exhaust gas test).

NOx purification efficiencies at deceleration in a federal test procedure (FTP) mode (an automobile driving mode for exhaust gas) were measured for Examples 1 and 2 and Comparative Examples 1 and 2. FIG. 11 shows part of the FTP mode. In this case, deceleration periods are a period "from 32 seconds to 38 seconds," a period "from 51 seconds to 54 seconds," and a period "from 115 seconds to 125 seconds" enclosed by circles in FIG. 11.

Table 6 shows the results of the above measurement. A comparison between Examples 1 and 2 and Comparative Examples 1 and 2 shows that NOx purification efficiency at deceleration is high in Examples 1 and 2. In particular, a large difference in NOx purification efficiency is observed after a short lapse of time from a start-up of an engine, i.e., when the exhaust gas temperature is low.

TABLE 6

| | NOx purification efficiency (%) at deceleration | | |
|---|---|---|---|
| | 32-38 sec. | 51-54 sec. | 115-125 sec. |
| Example 1 | 93.2 | 94.0 | 100.0 |
| Example 2 | 94.9 | 95.2 | 100.0 |
| Comparative Example 1 | 88.0 | 91.0 | 98.0 |
| Comparative Example 2 | 90.5 | 91.9 | 99.0 |

As shown in Table 6, Examples 1 and 2 show high NOx purification efficiencies. This is supposed to be because of the following reasons. In Examples 1 and 2, Rh-doped CeZrNdY composite oxide (small particles) was used as an oxygen storage/release material for the upper catalyst layer of the downstream catalyst. This structure causes the oxygen release amount per a unit amount of Rh included in or loaded on the oxygen storage/release material for the downstream catalyst to be larger than that for the upstream catalyst, and allows the oxygen storage/release material to be often in contact with an exhaust gas.

Comparison between Example 1 and Example 2 shows that the NOx purification efficiency of Example 2 is higher than that of Example 1. This is because ZrLaSr composite oxide containing an alkali earth metal Sr was adopted as ZrLa-based composite oxide for the upper catalyst layer of the downstream catalyst in Example 2.

<Emission Amount in FTP Mode>

Figure 12:
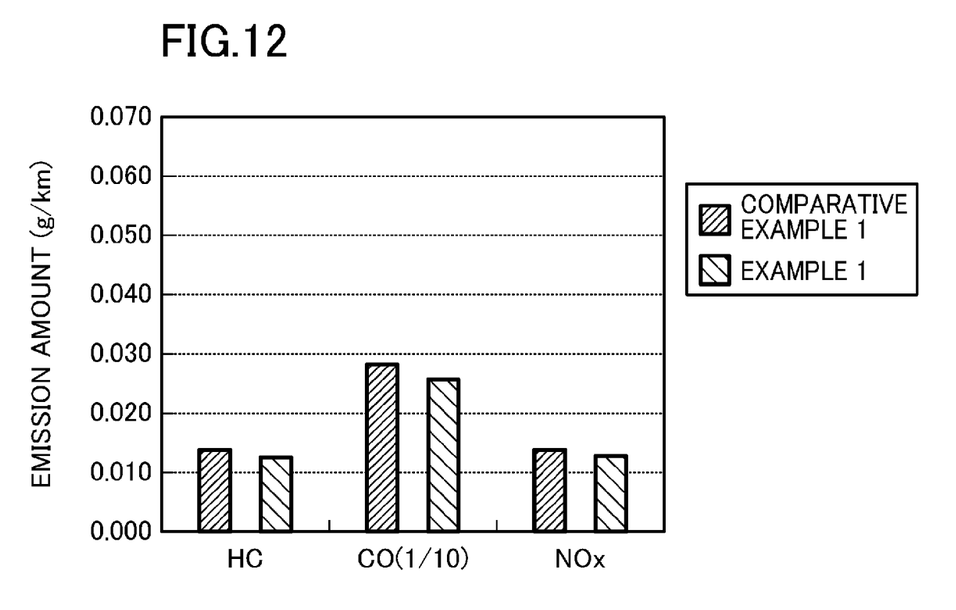
FIG. 12 is a graph showing emission amounts of Example and Comparative Example.

FIG. 12 shows results of measurement of the amounts of emission (HC, CO, and NOx) in an FTP mode in Example 1 and Comparative Example 1. FIG. 12 shows that the catalyst of Example 1 exhibits high performance not only for NOx purification but also purification of HC and CO.

What is claimed is:

1. An exhaust-gas purification catalytic system, comprising an upstream catalyst and a downstream catalyst provided upstream and downstream, respectively, in a flow of exhaust gas in an exhaust passage of an engine, wherein
    each of the upstream catalyst and the downstream catalyst includes a plurality of catalyst layers stacked on a substrate,
    the plurality of catalyst layers of each of the upstream catalyst and the downstream catalyst include an upper catalyst layer containing an oxygen storage/release material in/on which a catalytic metal is included or loaded,
    a content of the oxygen storage/release material per 1 L of the substrate in the upper catalyst layer of the upstream catalyst is larger than that in the upper catalyst layer of the downstream catalyst,
    an oxygen release amount per a unit amount of a catalytic metal included in or loaded on the oxygen storage/release material for the upper catalyst layer of the downstream catalyst is larger than that for the upper catalyst layer of the upstream catalyst, and
    at least part of the oxygen storage/release material included in the upper catalyst layer of the downstream catalyst shows a particle size distribution having a peak particle size smaller than that included in the upper catalyst layer of the upstream catalyst.

2. The exhaust-gas purification catalytic system of claim 1, wherein
    at least part of the oxygen storage/release material included in the upper catalyst layer of the upstream catalyst is made of Rh-loading CeZr-based composite oxide containing Ce and Zr and loading Rh thereon, and
    at least part of the oxygen storage/release material included in the upper catalyst layer of the downstream catalyst is made of Rh-doped CeZr-based composite oxide containing Ce and Zr and also containing Rh dissolved therein.

3. The exhaust-gas purification catalytic system of claim 1, wherein
    the upper catalyst layer of the downstream catalyst including the oxygen storage/release material further includes a catalytic component in which ZrLa-based composite oxide containing Zr and La is loaded on activated alumina and Rh is loaded on the ZrLa-based composite oxide, and
    at least part of the oxygen storage/release material included in the upper catalyst layer of the downstream catalyst constitutes at least part of a binder in the upper catalyst layer of the downstream catalyst.

4. The exhaust-gas purification catalytic system of claim 2, wherein
    the upper catalyst layer of the downstream catalyst including the oxygen storage/release material further includes a catalytic component in which ZrLa-based composite oxide containing Zr and La is loaded on activated alumina and Rh is loaded on the ZrLa-based composite oxide, and
    at least part of the oxygen storage/release material included in the upper catalyst layer of the downstream catalyst constitutes at least part of a binder in the upper catalyst layer of the downstream catalyst.

5. The exhaust-gas purification catalytic system of claim 3, wherein the ZrLa-based composite oxide further contains an alkali earth metal in addition to Zr and La.

6. The exhaust-gas purification catalytic system of claim 1, wherein
    in an exhaust-gas temperature range from 350° C. to 500° C., both inclusive, an oxygen release amount per a unit amount of the catalytic metal of the oxygen storage/release material included in the upper catalyst layer of the downstream catalyst is 1.25 times as large as that in the upper catalyst layer of the upstream catalyst or more.

7. The exhaust-gas purification catalytic system of claim 2, wherein
    in an exhaust-gas temperature range from 350° C. to 500° C., both inclusive, an oxygen release amount per a unit amount of the catalytic metal of the oxygen storage/release material included in the upper catalyst layer of the downstream catalyst is 1.25 times as large as that in the upper catalyst layer of the upstream catalyst or more.

* * * * *